United States Patent [19]
Gampp

[11] 3,777,711
[45] Dec. 11, 1973

[54] WILDLIFE STATION HOLDER

[76] Inventor: Robert J. Gampp, 120 Hutchinson Rd., Arlington, Mass. 02174

[22] Filed: Aug. 11, 1972

[21] Appl. No.: 279,950

[52] U.S. Cl. .................................. 119/23, 119/52 R
[51] Int. Cl. ...................... A01k 31/00, A01k 05/00
[58] Field of Search ....................... 119/23, 52 R, 51

[56] References Cited
UNITED STATES PATENTS
| | | | |
|---|---|---|---|
| 2,775,226 | 12/1956 | Early | 119/52 R |
| 3,179,244 | 4/1965 | Kuhn | 119/52 R X |
| 388,385 | 8/1888 | Wooster | 119/23 UX |
| 2,195,575 | 4/1940 | Mallgraf | 119/52 R |

Primary Examiner—Hugh R. Chamblee
Attorney—Joseph S. Iandiorio

[57] ABSTRACT

A wildlife station holder adapted for receiving a container insert including a rear wall, front wall, and two side walls joined together to form a four sided enclosure to receive a container, at least one of the walls having a feed hole in it or an access hole in it sized to accommodate the particular occupant and a bottom plate extending between the four walls to support a container insert.

9 Claims, 5 Drawing Figures

WILDLIFE STATION HOLDER

FIELD OF INVENTION

This invention relates to a multi-purpose wildlife station holder and more particularly to such a holder preformed to use a container as a bird house or feeder.

BACKGROUND OF INVENTION

Wildlife servicing stations such as houses and feeders for birds, squirrels and the like are typically relatively expensive one purpose devices. Typically a feeder cannot be used as a house and a house having the proper characteristics of access ways, volume etc. to attract one type of bird may not be acceptable to another type. In addition once a nest is built in such a house the house may be subsequently unattractive even to the same type unless the old nest is removed.

SUMMARY OF INVENTION

It is therefore an object of this invention to provide a wildlife servicing station which uses a preformed holder for adapting a container for use as a house or as a feeder or both of them alternatively.

It is a further object of this invention to provide such a wildlife servicing station holder which can be used over and over again with a minimum of effort required to accommodate it to the requirements of each new occupant desired to be attracted and with a minimum of effort required to clean it and make it ready for the next occupant.

It is a further object of this invention to provide such a preformed holder which may be used to adapt a container for any one of a number of different occupants.

The invention results from the realization that an inexpensive multipurpose wildlife servicing station can be made utilizing standard, inexpensive containers, even discarded containers such as used milk cartons, by providing a holder which supports such a container and has one or more holes in it that can be used as feed holes or access holes when a corresponding hole is provided in the container.

The invention features a wildlife station holder adapted for receiving a container insert. The holder includes a rear wall, front wall and two side walls joined together to form an enclosure to receive a container. At least one of the walls has a feed hole in it or an access hole in it sized to accommodate a particular occupant and there is a bottom plate extending between the four walls to support the container insert.

DISCLOSURE OF PREFERRED EMBODIMENT

Other objects, features and advantages will occur from the following description of a preferred embodiment and the accompanying drawings, in which.

Figure 1:
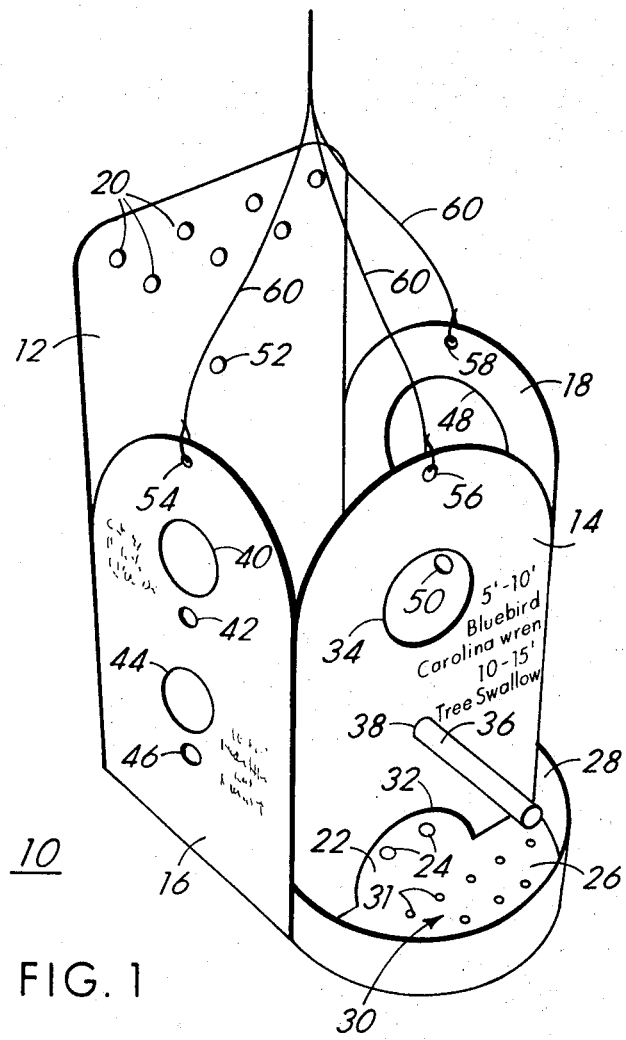
FIG. 1 is an axonometric view of a holder according to this invention adapted for holding a container for use as a wildlife servicing station.
Figure 5:
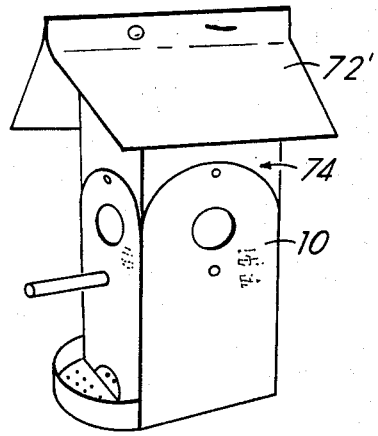
FIG. 5 is an axonometric view of the holder of FIG. 1 being used as a house and containing the container of FIG. 4 according to this invention.

The invention may be accomplished using a holder having three or more sides joined together to form an enclosure for a container having three or more sides. A bottom plate covering at least a portion of the bottom of the holder between the sides is provided to support the container in case. A narrow ledge on one or more of the sides may suffice for this purpose. If a solid bottom plate is used a drain means, such as one or more holes in the bottom plate may be used to prevent accumulation of rain water. Typically at least one of the sides has at least one access hole in it having a diameter of the size required to attract a desired animal or bird. Care is also taken to make sure that the access hole is the proper distance above the bottom of the holder to further ensure the attractiveness of the device as a house for the desired animal or bird. Typically there may be access ways of different sizes in each of the side walls and even more than one access hole per side wall so that the holder may be adaptable for a number of different birds or animals. In addition a small hole may be provided beneath each access hole for mounting a perch peg if the device is to be used as a bird house. Means for mounting or suspending the holder may also be provided. For example, one or more of the walls may have holes in them to receive screws or nails or similar fasteners for mounting the holder on a tree or pole or building. In addition some engaging means may be provided on two or more sidewalls to enable the holder to be suspended. For example, two of the walls may have holes in them for receiving a wire or bale which can be hung on a branch or a hook.

The holder of this invention is made to be a multipurpose device by providing, for example, an extension of the bottom plate out beyond one of the side walls with a low wall arising from it to produce a trough for holding animal feed such as bird seed. The associated side wall is provided with a small hole through which feed provided in the container supported in the holder may move outwardly to keep the trough filled.

In use, typically, the holder is made as a four sided device having four side walls sized to receive a one quart or half gallon or even a full gallon empty milk carton. Initially a decision is made as to whether this particular holder and container combination is going to be used as a feeder or, for example, a bird house, and if a bird house what type of bird it is desired to attract. Thus if it is desired to attract a bird such as a chickadee which prefers an access hole of about 1 ⅛ inches in diameter then the container is put in the holder and a hole is cut in the container at the place corresponding to the access hole in the holder which has a 1 ⅛ inches diameter. The used milk carton and holder then instantenously become a bird house, specifically designed for attracting chickadees. Similarly, the holder can be used with a suitable container for attracting any other type of bird which prefers an access hole having a diameter which is among those provided in the holder. In addition if it is desired to use the holder with a container as a feeder then the appropriate hole is cut proximate the bottom of the container at the position corresponding to the feed hole at the trough and the holder and container become a feeder.

In one specific embodiment, FIG. 1, there is shown a multipurpose wildlife station holder 10 especially designed to be used as a bird feeder or a bird house for a variety of different birds. Holder 10 includes a rear wall 12, front wall 14, and two side walls 16 and 18 joined together to form an enclosure for a container described in more detail with reference to FIGS. 2 through 5, infra. Rear wall 12 may be made slightly higher than walls 14, 16, 18 and be provided near its upper end with a plurality of mounting holes 20 which may be used to receive screws or nails or to hang on hooks or pegs for mounting holder 10 on a building, tree, pole, or the like. Bottom plate 22 may be provided as a support for a container to be inserted into holder 10 and may be provided with a plurality of holes 24 to provide drainage to prevent the accumulation of rain water and the like. Bottom plate 22 may be extended beyond front wall 14 to form a platform 26 about which there is located a lip or ridge 28 that creates a trough 30 for feed in the event that the holder should be used in combination with the container to form a feeder. A feeder hole 32 is therefore provided in the lower part of front wall 14 to permit the feed to move from within holder 10 to fill trough 30. Drainage means such as small holes 31 may be provided in platform 26 of trough 30.

Each of the four walls 12, 14, 16 and 18 may have one or more access holes having different sizes to attract different types of birds or other animals. For example, as illustrated in FIG. 1, access hole 34 may be made with a 1 ½ inches diameter located 5 inches above the bottom of holder 10 and having associated with it a perch peg 36 mounted in perch peg hole 38 1 inch beneath access hole 34. Such dimensions are preferred by bluebirds and carolina wrens when the access hole is 5 to 10 feet above the ground and by tree swallows when the access hole is 10 to 15 feet above the ground. Side wall 16 may be provided with an access hole 40 having a 1 ⅛ inches diameter located 5 ½ inches above the bottom of holder 10 and having a perch peg hole 42 1/2 inch below access 40. This set of dimensions is particularly attractive to chickadees when the access hole is located 6 to 15 feet above the ground. A second hole, access hole 44 may be provided in side wall 16; access hole 44 has a diameter of 1 inch and is located with its center 2 ¼ inches above the bottom of holder 10 and is associated with a perch peg hole 46 which is 1/2 inch below hole 44. This set of dimensions is attractive to a house wren especially when the access hole is located 6 to 10 feet above the ground. Another access hole 48 having a diameter of 1 ¼ inches and having its center located 5 ½ inches above the bottom of holder 10 is provided in side wall 18. There is associated with access hole 48 a perch peg hole 50 which is 1 inch below access hole 48. This set of dimensions is preferred by the titmouse and downy woodpecker when the access hole is located 6 to 15 feet above the ground and by nuthatches when the access hole is located 12 to 20 feet above the ground.

Various other access holes and combinations of access holes may be provided to attract various other types of birds. For example, a crested flycatcher prefers a 2 inch diameter access hole 8 to 20 feet above the ground; whereas a redheaded woodpecker and a goldenfronted woodpecker prefer a 1 ½ inch diameter access hole 12 to 20 feet above the ground and a saw-whet owl prefers a 2 ½ inch diameter hole 12 to 20 feet above the ground. For convenience the name of the bird and the height above ground may be embossed or otherwise written on the walls of holder 10 proximate the holes which that particular bird prefers as shown in FIG. 1.

An additional mounting hole 52 may be provided lower down on rear wall 12 so that it is accessible, for example, to a screwdriver through access hole 34 in front wall 14; mounting hole 52 has the same function as holes 20. Mounting hole 52 may also be used in conjunction with one or more holes 54, 56 and 58 to engage a bale or loop of wire or two, three, four or more wires 60 when it is desired to suspend holder 10 from a tree limb or eave or the like. Alternatively holes 20, 52, 54, 56 or 58 may be pins, pegs, hooks or the like for gripping a loop of wire, a hole in a board or any similar mounting device.

Figure 2:
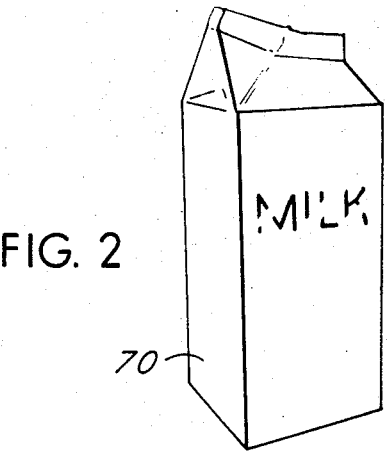
FIG. 2 is an axonometric view of a typical container such as a used milk carton which may be used with the holder according to this invention.
Figure 3:
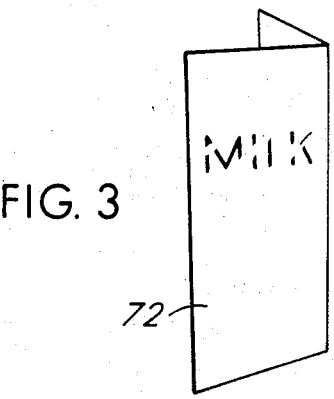
FIG. 3 is an axonometric view of two sides of a milk carton similar to that shown in FIG. 2 which may be used as a supplementary roof for the milk carton of FIG. 2.
Figure 4:
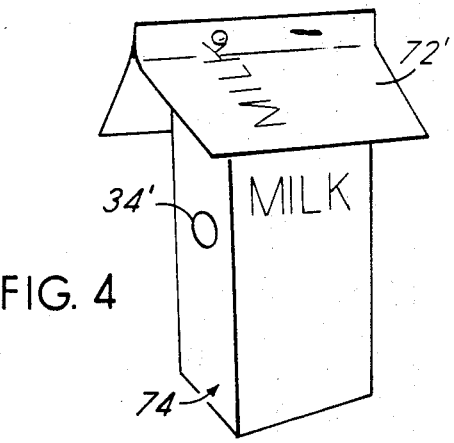
FIG. 4 is an axonometric view of the milk carton of FIG. 2 with the supplementary roof of FIG. 3 installed on it and an access hole cut in it corresponding to the access hole in the front wall of the holder of FIG. 1.

In use a used milk carton is ideal as a container for insertion in holder 10, FIG. 2. A typical milk carton 70, FIG. 2, may be used as the basic container and then a second milk carton may be used to provide a supplementary roof portion. For this the top and bottom of the milk carton are cut off leaving a flexible four sided topless and bottomless container. This container is then slit along a diagonally opposite pair of corners to form two sets of connected sides 72. One of those sets of sides, FIG. 3, side 72 may then be attached to the top of milk carton 70 to provide a supplementary roof 72' with a substantial overhang that amply shields an access hole from rain and which also acts to shield a bird sitting on a perch peg. The resulting container 74, FIG. 4, is then provided with a hole such as access hole 34' corresponding to access hole 34 in front wall 14 of holder 10, FIG. 1. The assembled container 74 constructed entirely from recycled or discarded milk cartons is then inserted in holder 10, FIG. 5, to provide a unitized, leakproof, waterproof and rugged birdhouse.

At any time when a different bird is desired to be attracted it is only necessary to create a new insert container 74, FIG. 4, and cut a new hole in that container corresponding to the access hole of the proper size for the new bird now desired to be attracted. Alternatively, if holder 10 is not to be used as a birdhouse but as a birdfeeder the container can have a portion cut away corresponding to feed hole 32 and then container 74 will be filled with birdseed prior to the attachment of supplementary roof 72'. A supplementary roof member 72' may be especially advantageous when the container used is one which must suffer damage to the integrity of the roof for dispensing milk, i.e., in certain types of cartons using a pull tab type of opening mechanism a section of the roof is actually removed.

This construction is particularly advantageous because it makes good use of otherwise discarded, used milk cartons and, in a manner of speaking, recycles them, at least for an additional period of time before they become totally useless. And these waxed, waterproof containers provide an excellent outdoor structure which is quite weatherproof and can be used to protect either the bird or animal which is to be its occupant or the feed which is to be provided to attract the birds and/or animals.

In addition whenever it is desired to attract a different bird or to convert from a house to a feeder or at the end of a season when it is required to get rid of old nests in order to make way for the next seasons occupants it is only necessary to lift container 74 from holder 10 and deposit it in the garbage and quickly replace it with a new container 74.

Other objects will occur to those skilled in the art and are within the following claims.

What is claimed is:

1. A holder for a wildlife house and feeder adapted for releasably, replaceably holding a waterproof, disposable container constituting the house and feeder comprising a rear wall, a front wall and two side walls interconnecting said front and rear walls; a retainer member mounted proximate the lower end of at least one of said walls for supporting a said container; each of at least three of said walls having at least one access hole, each said hole being of a different diameter, a feeder hole in one of said walls proximate the bottom of that wall, a support member extending beyond said wall at said feeder hole for supporting feed external to the holder, and a raised lip extending about said support member for containing the feed.

2. The holder of claim 1 in which said retaining means includes drainage means.

3. The holder of claim 1 in which each of said access holes has located beneath it a perch peg hole for mounting a perch peg.

4. The holder of claim 1 in which one of said walls is higher than the other three and includes means for mounting said holder to a support.

5. The holder of claim 1 in which at least two of said walls include means for engaging a suspension device for hanging said holder.

6. The holder of claim 1 further including a container disposed in said holder and having a hole in it corresponding to one of said feed and access holes.

7. The holder of claim 6 further including an extended roof member attached to the top of said container and overlapping each side of said container which contains a feeder or access hole.

8. A holder for a wildlife house and feeder adapted for releasably, replaceably holding a waterproof, disposable container constituting the house and feeder comprising a rear wall, a front wall and two side walls interconnecting said front and rear walls; a retainer member mounted proximate the lower end of at least one of said walls for supporting a said container; each of at least three of said walls having at least one access hole, each said hole being of a different diameter, a feeder hole in one of said walls, proximate the bottom of that wall, a support member extending beyond said wall at said feeder hole for supporting feed external to the holder, a raised lip extending about said support member for containing the feed and a waterproof disposable container disposed in said holder having an opening in it corresponding to one of said holes.

9. A holder for a wildlife house and feeder adapted for releasably, replaceably holding a waterproof, disposable container constituting the house and feeder comprising a rear wall, a front wall and two side walls interconnecting said front and rear walls; a retainer member mounted proximate the lower end of at least one of said walls for supporting a said container; each of at least three of said walls having at least one access hole, each said hole being of a different diameter.

* * * * *